United States Patent
Milanes Garcia-Moreno

(10) Patent No.: US 8,719,187 B2
(45) Date of Patent: May 6, 2014

(54) ELECTRONIC AND MECHANICAL SYSTEM FOR AUTOMATED OR DISCRETIONAY DOSAGE OF POTABLE WATER AT THE PARTICULAR INTAKE LEVEL OF EACH USER

(76) Inventor: Fernando Milanes Garcia-Moreno, Mexico City (MX)

(*) Notice: Subject to any disclaimer, the term of this patent is extended or adjusted under 35 U.S.C. 154(b) by 2378 days.

(21) Appl. No.: 10/472,221

(22) PCT Filed: Mar. 22, 2002

(86) PCT No.: PCT/IB02/00884
§ 371 (c)(1),
(2), (4) Date: May 28, 2004

(87) PCT Pub. No.: WO02/077580
PCT Pub. Date: Oct. 3, 2002

(65) Prior Publication Data
US 2004/0199476 A1 Oct. 7, 2004

(51) Int. Cl.
*G06F 17/00* (2006.01)
*G05D 7/00* (2006.01)

(52) U.S. Cl.
USPC ............................ 705/413; 700/282

(58) Field of Classification Search
USPC ......... 705/400, 412, 413, 28–30; 340/870.02, 340/870.05, 870.07; 251/129.14; 702/45, 702/46; 700/282; 73/198, 861; 222/14; 137/487.5
See application file for complete search history.

(56) References Cited

U.S. PATENT DOCUMENTS

| | | | | |
|---|---|---|---|---|
| 4,495,596 A | * | 1/1985 | Sciulli | 714/14 |
| 4,777,354 A | * | 10/1988 | Thomas | 235/380 |
| 4,888,702 A | * | 12/1989 | Gerken et al. | 700/295 |
| 4,940,976 A | * | 7/1990 | Gastouniotis et al. | 340/870.02 |
| 5,331,995 A | * | 7/1994 | Westfall et al. | 137/8 |
| 5,485,150 A | | 1/1996 | Hisanaga et al. | |
| 5,811,675 A | * | 9/1998 | Hamer | 73/198 |
| 5,963,146 A | * | 10/1999 | Johnson et al. | 340/870.01 |
| 6,161,100 A | | 12/2000 | Saar | |
| 6,220,566 B1 | * | 4/2001 | Miller | 251/58 |
| 6,470,903 B2 | * | 10/2002 | Reyman | 137/1 |

FOREIGN PATENT DOCUMENTS

JP 355143613 * 11/1980 ............. G05B 13/04

* cited by examiner

*Primary Examiner* — Igor Borissov
(74) *Attorney, Agent, or Firm* — Roylance, Abrams, Berdo & Goodman, L.L.P.

(57) ABSTRACT

The invention refers to the technical field of the water supply measurement and control systems. The invention may be installed at the water connection of a user before or after a meter, and provides the necessary means and signals for the interconnection thereof. The system of the present invention comprises a Micro-controller device so the carried-out actions may be modified as per the water consumption market requirements, it further comprises a motorized valve which is connected at the user water connection. Each pulse transmitted from the meter is sensed by the System of the invention, updating a time window in a Real Time Clock, on which the updating of the volume permitted to a determined subscriber is registered. The volume consumed by the subscriber is compared with a stored reference at the memory of the invention. If the comparison is successful, the invention shall actuate the system to reduce the subscriber's flux to a determined level or to completely interrupt the supply, reestablishing again the supply upon ending the dosage control time window, repeatedly and indefinitely until a new programming.

25 Claims, 8 Drawing Sheets

UDA

ELECTRONIC AND MECHANICAL SYSTEM FOR AUTOMATED OR DISCRETIONAY DOSAGE OF POTABLE WATER AT THE PARTICULAR INTAKE LEVEL OF EACH USER

This invention refers to the technical field of measurement and control of water supply.

Since potable water is a limited resource, and even insufficient in many places around the planet, it turns out to be very important for water companies to be able to control the volume that particular users consume at their premises. This control of water supply may be very useful to implement water saving programs without applying general restrictions.

Dosified water service is also useful to control the volume supplied to those users that cannot afford to pay for it, or those that having a limited budget would not want to exceed a certain service cost in a billing period. Limiting volume supply may also be a tool to sanction those non-paying customers where local legislation does not allow their total disconnection from the service. In this last case, it is a common practice to install a flow restrictor at the inlet, but the water company does not have control over the volume consumed by that user. The control of supplied volume may help to solve this problem, by allowing a limited volume supply on a daily basis.

The implementation of a method to control the volume of water supplied may also serve the purpose of creating awareness on the volume of water that users consume.

Now, the management of water supply can be made more efficient not only by controlling the volume of daily consumption, but also by distributing the rate of consumption throughout the day according to the best interests of the Water Company, be it to take advantage of better energy costs, or to balance the demand evenly along the day to make better use of the distribution installed capacity. These can be obtained by applying Time-of-Use (TOU) tariffs to incentive users to adopt the desired behavior.

A water supply control system may also be taken advantage of to help improve the collection efficiency of the Water Company, because it allows to inflict a restriction in supplied volume to the non-paying customer, or even more, to supply only water that has been previously paid for, hence greatly benefiting the Water Company financially.

At present, a considerable number of devices in the technical field of the present invention exist and the technical literature on the subject reports several devices related to water management, such as those disclosed in U.S. Pat. No. 4,499,764 referring to a modular measurement apparatus, U.S. Pat. No. 5,574,229, that protects an electronic water meter with correction for flow velocity, U.S. Pat. No. 4,708,264 that protects a water switch and U.S. Pat. No. 4,858,427 disclosing an electronic water sprinkler, nevertheless a device operated by a water company to control the supply of water at the inlet of the premises of each user has yet to be disclosed, since until now even in prepayment systems it is the user who decides the amount of water to be consumed which will be as much as he wants to pay.

One of the objectives of the present invention is to provide water companies with a water supply control equipment that allows the passage of a given volume of water on a daily basis at a desired instantaneous flowrate, autonomously and repeatedly until re-programming; such an equipment that also offers incentives to water consumers to modify their daily consumption profile, and that can be interfaced with (read and/or programmed) electronically on site or at a distance, and that can be operated as a prepayment system at convenience.

Since the system of the present invention uses a microcontroller, its mode of operation may be modified to meet the requirements of the water consumer and the water Company's.

The invention incorporates a valve and an actuating mechanism that allows the passage of water or its interruption, hence it is installed at the water inlet of the premises of the water consumer, before or after the water meter.

The flow of water is measured by a water meter equipped with a pulse generator, which every certain volume of water passing through the meter emits a signal that is coupled to the circuitry of the system. Each pulse generated by the water meter is sensed by the system of the invention as it briefly wakes-up from the sleep state in which it normally is to optimize energy-use and extend its autonomy or product "life". In the present case a lithium battery is employed as the energy source, because it will offer the system an operating life of several years even if the valve is actuated twice a day.

Concurrently, a real-time clock which is also an element of the present invention, updates a window of time over which the consumed volume will also be updated. The water volume consumed by the user is compared to the reference volume stored in the memory of the invention. When the volume consumed equals the reference volume allowed, the invention will actuate the motorized valve to reduce the flowrate to a predetermined level, or even to interrupt supply completely.

The invention continues to verify the predetermined window of time until it comes to an end and then service is re-established by actuating the motorized valve again.

The application program refers to the real time clock also to deduct the consumed volume from the reference volume allowed according to the time-of-use rates predetermined for each hour of the day.

Utilizing the available resources, it is possible for the application program to operate the opening and closing of the valve in a prepayment mode, wherein the reference volume allowed would be a prepaid credit value transferred to the invention by the user.

As the water meters may be installed outdoors or even out in the street, the physical installation of the invention would take place under the same conditions. It is for this reason that the invention is presented as a "black-box" with no buttons, displays, reading slots or communication ports that may be susceptible of vandalism; it also incorporates the means to detect unauthorized intrusion, tampered cables or fraud attempts, and register these events it the internal memory.

The system keeps record of the consumption and the remaining volume in the current period, but it also stores the total volume registered since its initialization, hence the invention may also be utilized as an electronic reading system, wherein the information can be accessed through serial connection or wireless communication. The invention is configured through these same means.

BRIEF DESCRIPTION OF THE DRAWINGS

In order to properly illustrate the present invention, the description includes several drawings that are described below.

DESCRIPTION OF THE PREFERRED EMBODIMENT

Figure 1:
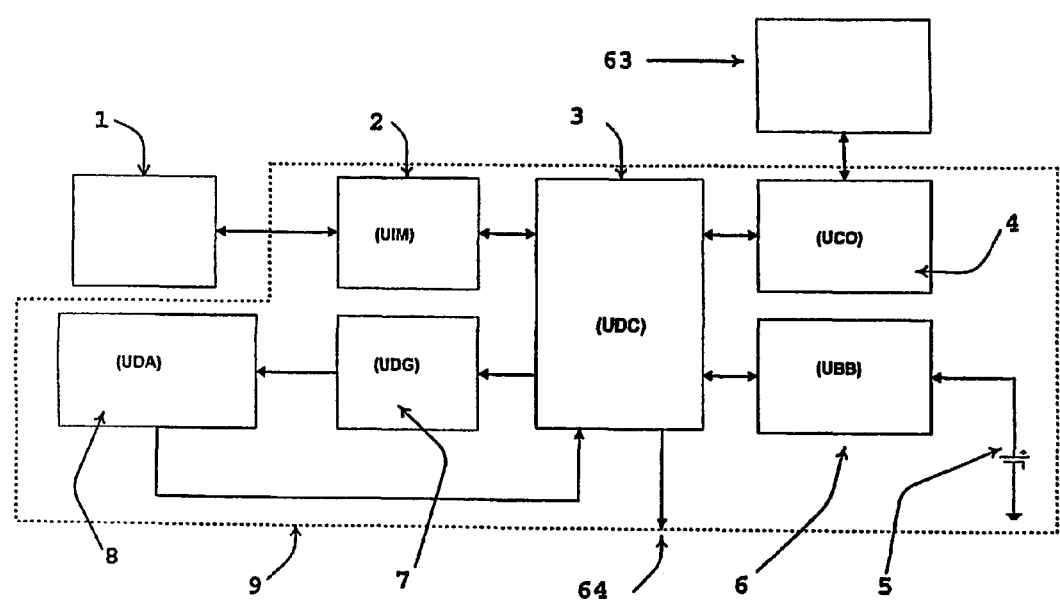
FIG. 1 illustrates generally the blocks of the main members of the invention.

The invention is generally illustrated on FIG. 1. The invention is connected to a water meter (1) by means of the Meter Interface Unit (UIM) (2). All the circuits and mechanical elements that are part of the invention are contained in a sealed enclosure (9), the later element protects the invention from the environment, water immersion, vandalism and tampering.

The invention is comprised of a Control Unit (UDC) (3) that perform all the operations required for the control of the water flow using the Gain Unit (UDC) (7) and the Actuation and Feedback Unit (UDA) (8). The Communication Unit (UCO) (4) is used to read the meter, configure the operation of the invention with the aid of a Computer (63) that can be personal or portable. The energy required for the operation of the invention is obtained from Energy Unit BAT (5), and the Low Battery Detection and Protection Unit (6) is used to monitor the energy level in BAT(5) and also to protect the circuitry from a possible inverse polarity connection of BAT (5).

Figure 2:
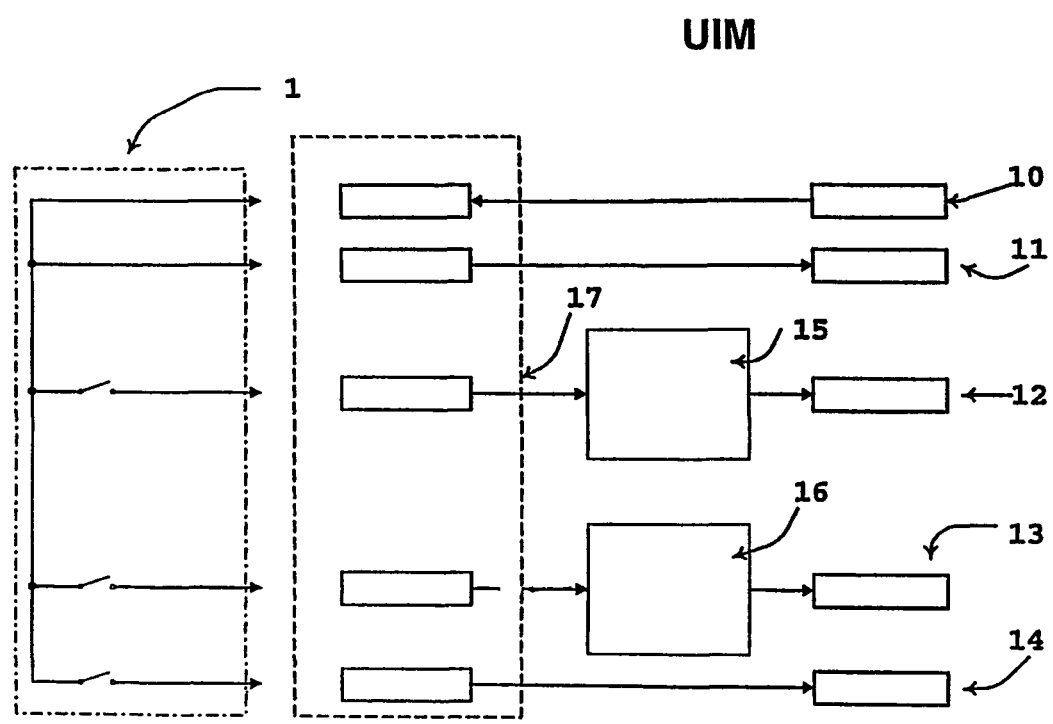
FIG. 2 illustrates the Interface-to-Meter Unit (UIM) in detail.

The Meter Interface Unit (UIM) (2) is illustrated in FIG. 2. Its purpose is to condition the signals coming out of the water meter (1) coupled by means of a cable (7) to the control unit (3) (signals 10, 11 and 14). The Low-pass filters (15) and (16) are used to reduce possible noise or contact bouncing coming from the meter (1) sensors. Each of the five arrows shown in the water meter (1) represents a function: Control, Cable Cut, Flow Detector, Back flow detector and Tampering detector.

Figure 3:
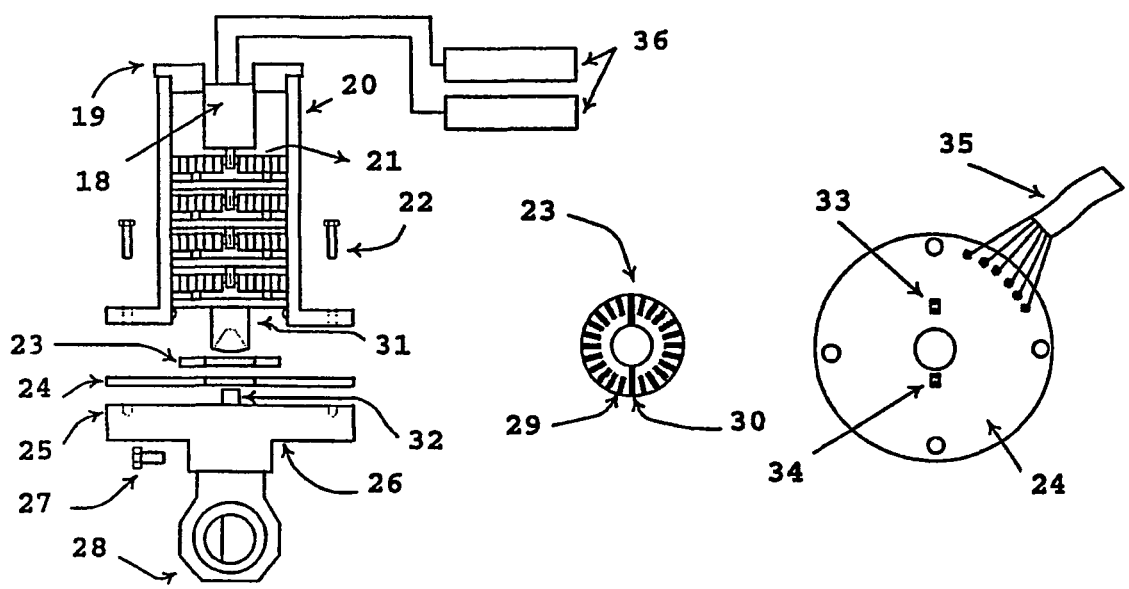
FIG. 3 refers to an illustration of the motorized valve and the feedback means conforming the Actuation and Feedback Unit (UDA).

On FIG. 3, the Actuation and Feedback Unit (UDA)(8) is illustrated. The unit uses a ball valve (28) to control the water flow using the mechanical energy from motor (18) that is coupled by an array of gears contained in cylinder (20). The motor is activated by means of signals (3) coming out of the Gain Unit (UDG)(7). The position o the valve (28) is detected by means of an optical encoder (24 and 23) coupled to the Control Unit (3) by means of a signal conductor (35).

Figure 4:
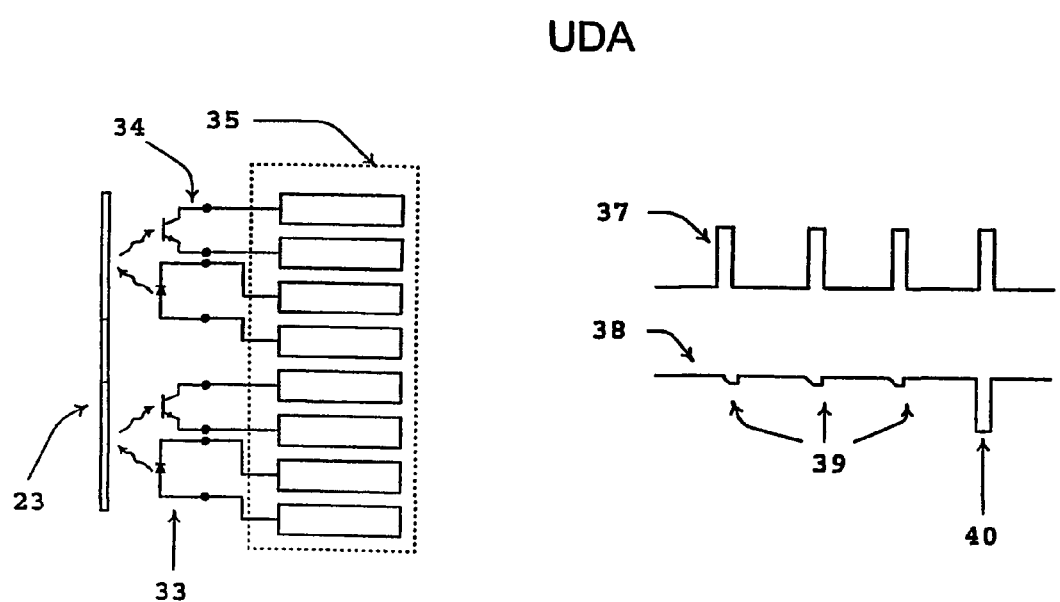
FIG. 4 illustrates in detail the circuitry and signals involved in determination of the position of the valve inside the UDA.

The drawing on FIG. 4 illustrates with more detail the construction of the optical encoder. The encoder is constructed by a encoder plate with reflective stripes (23) and a pair of optical emitter-receivers (33) and (34) that are mounted on printed circuit board (24). When the emitter-receivers (33) and (34) are exited using signal pattern (37), the emitter-receivers will output a signal with a pattern what will vary depending on the angular position of the ball valve (28).

Figure 5:
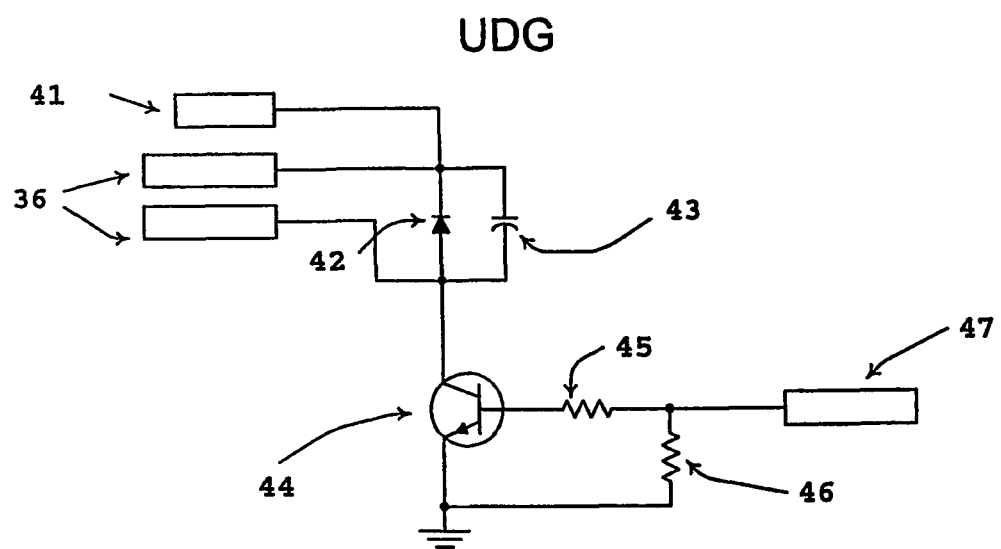
FIG. 5 illustrates generally the Gain Unit (UDG).

The Gain Unit (UDG)(7) is illustrated on FIG. 5. This unit is comprised of a transistor (44), signal conditioning resistors (45) and (46) and also transient and energy emission limiters (42) and (43). The UDG (7) is coupled to the Actuation and Feedback Unit (8) by the signal pair (36). The purpose of the UDG(7) is to convert a logic signal (47) from the Control Unit (UDC)(7) in to a signal that supplies the energy from the voltage supply (41) to the motor (18) contained in the Actuation and Feedback Unit (UDA) (8).

Figure 6:
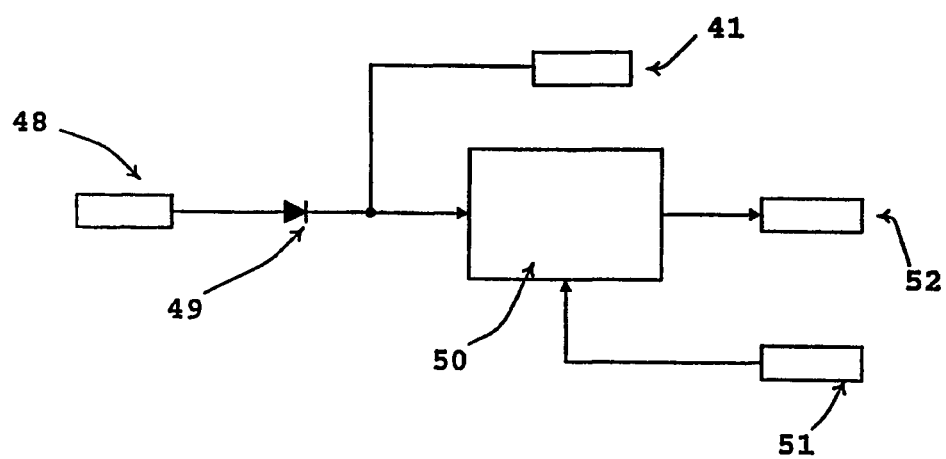
FIG. 6 illustrates the Low Battery Detection and Protection Unit (UBB).

The Low Battery Detection and Protection Unit (UBB)(6) is illustrated with more detail in FIG. 6. It is formed by a Schottky diode (49) that interconnects the Energy Unit BAT (5) to the voltage supply of the invention (41). The voltage detector (5) is used to notify to the Control Unit (UDC)(3) by means of signals (52) ad (51), the amount of energy contained in the Energy Unit BAT(5).

The Communication Unit (UCO) (4) shown in general in FIG. 3, transform the communication signals (53) and (54) in to signals that can be transmitted to an external computer (63). The later can be performed using a wired scheme by means of signals (57) and converter (55) or by a wireless method using converter (56) that couples the signals to an from an antenna (58).

Figure 8:
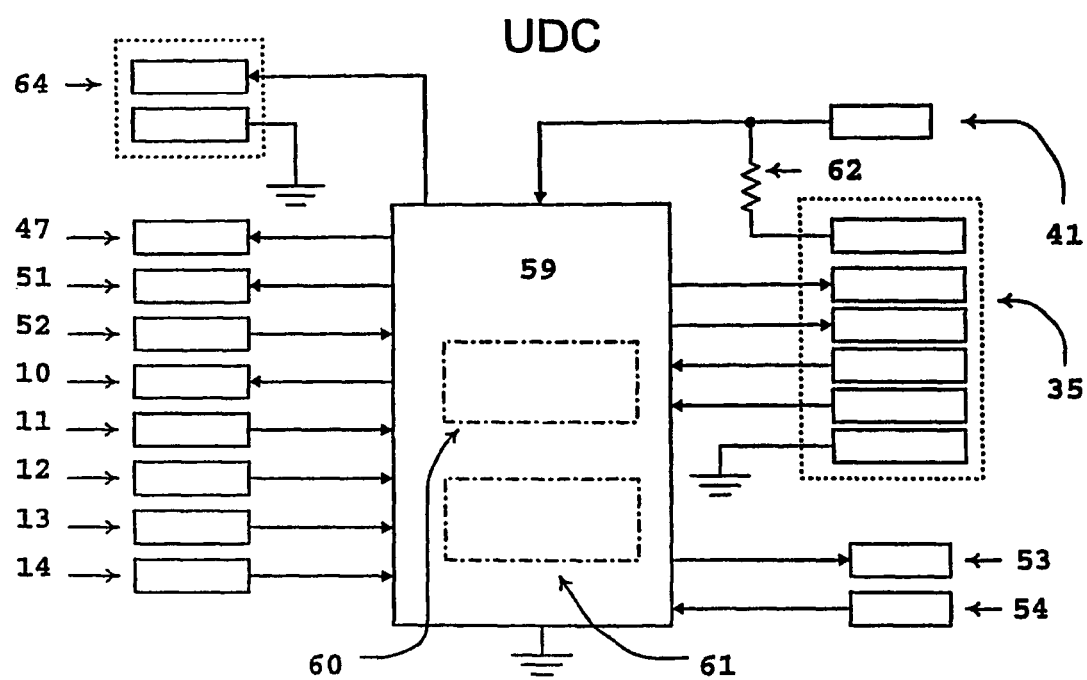
FIG. 8 illustrates the signal designation in the Control Unit (UDC).

The Control Unit (UDC) (3) is illustrated in FIG. 8. It comprises a Microcontroller (59) with embedded non volatile memory (60) used for the storage of parameters and a Real Time Clock (61) that maintains an stable time base. The UDC(3) is coupled to the rest of the units using input and output signals to and from the Microcontroller (59).

Connection to the Water Meter

The invention allows the interconnection to the typical signals available for water meters. For this embodiment, the typical signaling between the water meter (1) and the invention is illustrated in FIG. 2. The signals from the water meter (1) are connected to the Control Unit (UDC) (3) by means of a cable (17).

Using the signals supplied by (1) is possible to control by means of signal (10) the presence of electrical current in the pulse generator contained in (1). The pulse generator (1) supplies enough information to the Control Unit (3) to detect that the cable (17) is cut by means of signal M_CORTE (11). The water meter (1) also generates a pulse for each unit of volume by means of signal S_FLUJO (17) that in turn is filtered by low pass filter (15) to eliminate noise that could cause false readings in (3).

The filtered signal is acquired by the Control Unit (3) by means of signal M_FLUJO (12). The Magnetic Tampering Detector contained in (1) is activated when a external magnetic field is present and is coupled to the Control Unit (3) using C_VIOLA signal (14). As an additional protection against fraud, some water meters (1) add the possibility of back flow detection. The signal S_REFLUJO is also filtered by (16) to generate the clean signal M_REFLUJO (13); the later signal will indicate to the Control Unit (3) if the direction of the water flow goes from the interior to the exterior of the user premises. Depending on the criteria, the later situation can be used to discount the total volume consumption by the user and also a fraud or tapering situation can be considered as possible.

The Control Unit (3) illustrated in FIG. 8, is usually kept in a sleep state to minimize the energy consumption. To even reduce further the energy taken from the Energy Unit (5), the signal C_CTLUIM (10) is used to control the energy that goes in to the water meter (1) so in case that the flow, back-flow or tampering signals remain constantly active, signal (10) turns off the voltage supply and the Control Unit (3) enters an special mode in which signals 12, 13 and 14 are sampled in time until they change to a different state.

Volume and Time Acquisition

Depending on the type or brand of the Microcontroller (59) used for the implementation, the measuring of elapsed time can be performed internally by the same Microcontroller (59) using a coded scheme to construct what is known as a Real Time Clock (61). The purpose of this element is to maintain, in a concurrent fashion, a time base that will allow the generation of time periods or windows of time to measure the water volume that the user has used by means of signals (12) and (13) contained in the UIM(2) that in turn are generated by the water meter (1). The implementation of a Real Time Clock (61) can also be performed using external electronic circuits like the PCF8583 (Phillips). For the Microcontroller (59) the Real Time Clock (61) is seen as a group of register that we will name TIME_CURRENT.

Using the Computer (63), it is possible to configure the registers related to the Real Time Clock (61) and that are stored in the non volatile memory (60). We will name these registers SCHEDULE(1), SCHEDULE(2) and SCHEDULE (n) are use to configure hourly tariffs in conjunction with the registers FACTOR_H(1), FACTOR_H(2) and FACTOR_H (n). The later registers are used to apply factors or steps of subtraction ratios for the water volume that is available for that particular user; this available volume is stored in a register named CREDIT inside (60) and is also configurable by means of the computer (63).

In a similar fashion to the configuration of hourly rates previously described, the invention allows the configuration of volume scaled based tariffs. The later tariffs are dependent of the water volume consumed by the user from the start of a time window or period measured by the real time clock (61). The registers VOLUME_C, VOLUME(1), VOLUME(2) and VOLUME(m) are employed in conjunction with the registers FACTOR_V(1), FACTOR_V(2) and FACTOR_V(m) to modify the CREDIT register contained in (60).

A change in the logic state in signals (12) or (13), increments one of the n counters TOTAL(1), TOTAL(2) and TOTAL(n) stored in (3). To determine which of the counters to increment, the application program inside the Microcontroller (59) verifies the value of TIME_CURRENT register against the value stored in the registers SCHEDULE(1), SCHEDULE(2) and SCHEDULE(n). If for example, the value of TIME_CURRENT is lesser than the value stored in SCHEDULE(1), the application program will increment the counter TOTAL(1), the value contained in TOTAL(1) corresponds to the total amount of pulses acquired between the time period defined by SCHEDULE(n) and SCHEDULE(1). The use of counters that are dependant of time periods allow the water company to know the user profile of consumption against time also known as Time Of Use and is used for statistical purposes. The total amount of water volume consumed by that particular user will be then given by TOTAL (1)+TOTAL(2)+TOTAL(n). Concurrently, at the same time the TOTAL(1), TOTAL(2) or TOTAL(n) registers are incremented, the application program increments the register VOLUME_C that stores the amount of water volume consumed by the user since the beginning of the configured time period or window. The content of VOLUME_C register is used by the application program in the volume scaled based tariffs. The volume scaled based tariffs are used as an incentive or dissuasive for the user and consists in the use of a scale factor to the CREDIT register considering the amount of volume consumed by the user in a time period or window. Using the later tariff scheme, registers VOLUME(1) to VOLUME(m) work as the volume range, and FACTOR_V(1) to FACTOR_V(m) store the amount that will be subtracted from to the CREDIT register.

Once the totals are updated, the application program compares the value stored in the TIME_CURRENT register against SCHEDULE(1), SCHEDULE(2) and SCHEDULE (n) to determine which of the registers FACTOR_H(1), FACTOR_H(2) and FACTOR_H(3) will be applied. Concurrently, the value stored in register VOLUME_C is compared against the content of registers VOLUME(1), VOLUME(2) and VOLUME(m) that store the comparison thresholds to determine which of the registers FACTOR_V(1), FACTOR_V(2) or FACTOR_V(3) will be used to modify the value stored in CREDIT given the following relation: CREDIT=CREDIT−FACTOR_H(x)−FACTOR_V(z), where FACTOR_H(x) can take the value of FACTOR_H(1) to FACTOR_H(n) and FACTOR_V(z) can take the value of FACTOR_V(1) to FACTOR_V(m). Using the later process, the water company can reward or penalize the use of water depending on the total volume or the time of day when it was consumed.

The user and the water company can know in all times the rewards or penalizations applied to the CREDIT register since the CREDIT_RH will be incremented when the value in FACTOR_H(X) is equal to zero, that in a practical sense is water given for free. On the other side, another register called CREDIT_DH is modified by the following relation CREDIT_DH=CREDIT_DH+FACTOR_H(x) when the value stored in FACTOR_H(x) greater than zero. The later is used to totalize the amounts discounted to CREDIT given the values stored in the hourly based tariffs. For the volume scaled based tariff, the independent tantalization is given by the following registers and relations: CREDIT_RV=CREDIT_RV+1, when the value stored in FACTOR_V(z) is equal to 0; and CREDIT_RV=CREDIT_RV+FACTOR_V(z) when the value stored in FACTOR_V(z) is greater than zero.

As previously described, each time a pulse is presented in signals (12) and (13), the Microcontroller (59) contained inside the Control Unit (3) is awaken from the sleep state and performs the task mandated by the application program. The purpose of maintaining a "sleep state" in the Microcontroller (59) is to preserve energy, since all the actions are performed by (59) in a short time, the average electrical current drained from the Energy Unit BAT (59) is very low and in the orders of a millionth of an ampere. The low energy consumption is also optimized selecting the proper microcontroller (59). For this embodiment, the PIC16LC558 from Microchip Technology is an alternative but also device like the MSP430-112 from Texas Instruments have very good performance for low power applications. The majority of these types of microcontrollers are exited by oscillators that use very low frequency crystals (32,768 Hz) that further optimize the current consumption. It is important to notice that the explanation of this invention has been limited a certain type of application, however, the programmable nature of Microcontrollers like (59) allow the system to work with different behaviors and can be adjusted to the requirements of an specific market, water company or particular users. Also, the non volatile memory available in the selected Microcontroller (59) will impact in the amount of registers used like SCHEDULE(x), TOTAL(x), FACTOR_H(x), VOLUME(z) and FACTOR_V(z) and this is a factor limited by the current state of the art of the technology.

Register Capture

Each time the Microcontroller (59) awakes by a volume or time acquisition event, the application program compares the content of a register named TIME_CURRENT with the content of the register TIME_CAPTURE. When both values are equal, the Microcontroller (59) will store the content of the registers with names or addresses are stored in a data structure called LIST_CAPTURE. The content of the listed registers will be stored in a special area in the non volatile memory (60) and its content can be later retrieved from the invention by means of the Communication Unit (UCO) (4).

The logic structure of the TIME_CAPTURE register allows the operation to be performed in a periodic or one time fashion, the later capability gives the water company a way to have "dated balance" or captured readings at a pre-configured date or hour. The invention can have more than one TIME_

CAPTURE register and LIST_CAPTURE data structure since this is limited by the amount of memory available in the Microcontroller (59) selected for the embodiment.

Closure of the Valve Given Credit Expiration.

Each time the Microcontroller (59) makes a volume acquisition, the application program compares the content of register CREDIT with a value stored in the non volatile memory (60). The value of this register was previously configured using UCO (4). For this particular application, two comparison values are stored and will be named LOW_FLOW and CLOSURE.

If the value contained in CREDIT is equal to the value stored in LOW_FLOW, the Microcontroller (59) will activate signal C_MOT (47). Signal (47) sources electrical current to the base of the Transistor (44) contained in the Gain Unit (7) by means of the resistive network formed by (45) and (46) as shown in FIG. 5.

The electrical current take the Transistor (44) in to a saturation state and the voltage present at the negative signal of S_MOT (36) that goes to the Motor (18) shown on FIG. 3 will be very low referenced to ground. The later action makes an electrical current flow from signal VCC(41) to the Motor (18) trough collector and emitter of Transistor (44) to ground. The current inducts a magnetic field in the permanent magnet motor (18) so movement is generated in it. The free wheel diode (42) and capacitor (43), protect from voltage spikes generated by the inductive load of the Motor (18) when the flow of current in the Transistor (44) is interrupted.

As a way to show an example in the current embodiment, the Motor (18) is mounted using a retainer (19) in a plastic cylinder (20) with an has a geared interior finish. The cylinder (20) and the array of gears (21) form an planetary gear array that multiplies the Motor (18) mechanical torque. This multiplied torque is coupled to the shaft (31). Given the motor torque multiplication, the movement of the shaft (31) is very slow compared with the motor turns speed, but the torque has been increased enough to move the ball valve (28) that is coupled to the cylinder that contains the planetary gear (20) by means of a metallic plate (26), a retainer screw (27) and holding screws (22). The shaft (31) is coupled to valve shaft (32) so the ball inside the valve can rotate the later actions allow to control the flow of water that goes trough the valve.

The Control Unit (3) obtains a feedback of the position of the valve by means of the encoder (24 and 23) inside the Actuation and Feedback Unit (8) illustrated in FIG. 3.

The signals used to generate the flow control level for the vale are generated for this embodiment by means of an encoder formed by a pair of optical transmitter-receivers (33) and (34) mounted on a printed circuit board (24) in conjunction with an encoder plate (23) mounted in shaft (31).

The encoder plate (23) is constructed using a non-reflective material, and stripes of reflective material (30) and (29) are painted over the plate. The short stripes (29) are used to generate a relative position while the long stripes (30) are used as an absolute or index value.

The use of reflective optical transmitter-receivers (33) and (34) was considered for this embodiment given its small size, however, conventional photo interrupters can be used like the H22A1 from QT Optoelectronics and instead of using a reflective material plate, a slotted disc can be used.

The optical detector array (34) is used to determine the absolute or index position of the valve and identifies the position when the valve is closed. The optical array (33) is used to obtain a relative position from the index or closure position. Both optical arrays are mounted at a different distance from the center of printed circuit board (24).

For each quarter of turn of the sphere, the valve (28) goes from open to closed state. That is the reason the index or close indication stripes (30) are repeated twice over the encoder plate (23). The length of the index stripes is greater than the relative position stripes (29) in order to activate optical detector (34) placed to a shorter distance from the center of the printed circuit board (24).

The optical detectors (33) and (34) are activated by the UDC (3) when an electrical current flows trough a light emitting diode by means of signal C_LDAB contained in (35) using a pulse sequence (37) as illustrated in FIG. 4. The later action maintains a low average current to save energy. The current that flows trough the diode contained in (34) generates a beam of light that in turn is detected by the phototransistor contained in (34) when the position of the encoder plate coincides with a reflective stripe. The later action saturates the phototransistor contained in (34) and generates a pulse (40) that is detected by the UDC(3) by means of signal M_LDAB contained in (35). If the position of the plate is not coincident with a reflective stripe, the light detected by the photo-transistor will be very weak (39) to the electrical value generated for the signal is not detected by the UDC (3). The relative optical detector (33) operates in the same way as the index or closure (34).

When the Motor (18) is activated, the Control Unit (UDC) (3) activates the C_LDRE and C_LDAB with the pulse sequence (37) and concurrently monitors signals M_LDAB and M_LDRE, so a pattern in the voltage of the signal (38) will be used to determine the absence or presence of a reflective stripe. The detection of pulse (40) in M_LDAB will indicate that the valve has reached the closure or index position so it will be taken as the absolute or reference position. Counting pulses in M_LDRE will provide an indication of a position relative to the closure state, the later can allow several discrete position before reaching the total aperture of the valve.

Given the later actions, the Microcontroller (59) can know the position of the vale and in turn, it can reach a previously configure position stored in the non volatile memory (60).

Assuming that the valve is completely open, Motor (18) shall remain activated until Micro-controller (59) detects that the value contained in LEVEL_JET is equal to the pulse account present in signal M_LDRE. When the above occurs, Micro-controller (59) deactivates signal C_MOT (47) to stop Motor (18) advance and hence the spinning of shaft (32).

For the autonomous supply of water, the valve can be actuated to be placed in 3 positions that in turn will give 3 values of instantaneous rate of flow. The open valve value is stored in a register called LEVEL_APERTURE, a value that can be used to restrict flow rate can be programmed in a register called LEVEL_LOW_FLOW and a zero flow rate give by the total closure of the valve is stored in the LEVEL_CLOSURE register.

If we suppose that the valve is currently in a totally open state, Motor (18) will remain active until the Microcontroller (59) detects that the pulses counted in the signal M_LDRE is equal to the value stored in LEVEL_LOW_FLOW. When the later happens, the Microcontroller (59) turns off signal C_MOT (47) to stop the movement of the Motor (18) and in turn the shaft (32) rotation.

Since the valve has not been closed completely, the user will have the possibility of using the water with a reduced flow rate. If the user continues to use water, the Microcontroller (59) will continue to accumulate pulses from the water meter (1) but now it will compare the value of the register VOLUME against the value stored in register CLOSURE. If the values are equal, the Microcontroller (59) will turn on Motor (18) and using the optical detector (34) it will count the pulses in signal M_LDRE until the value of pulses is equal to the value stored in LEVEL_CLOSURE or until a closure or index position is detected by means of M_LDRAB; when the condition is meet, the Microcontroller (59) will turn off the Motor (18). A negative value in the CLOSURE register will maintain the valve in the LOW_FLOW position, this way the value of CREDIT can reach negative values until the comparison between both leads an equal value.

Valve Opening

Concurrently to all processes, the Microcontroller (59) maintains a time base to calculate a period or time window to reestablish the water flow if the service has been cancelled by the valve.

When the time period or window expires (value that is configured in a register), the Microcontroller (59) will update the CREDIT register with the following relation: CREDIT=CREDIT+RECHARGE when the systems will take in to account accumulated values from the previous time period or window; or with the following relation CREDIT=REGARGA if the previous non-used credit will not be taken in to account.

After the CREDIT register is updated, the application program will activate the Motor (18) and will take the valve to an open sate if the CREDIT value is greater than zero. The feedback or the valve position is carried out using the previously described process but now the Microcontroller (59) will keep the motor(18) in an active state until the opening position is detected; the later is done comparing the value stored in register LEVEL_APERTURE against the pulses at the output of the optical detector (33) by means of signal M_LDRE contained in (35).

For each opening or closure cycle, Motor (18) will rotate always in the same direction and the valve will move trough the four quadrants that control the flow rate. The Microcontroller (59) provides the means to program the desired sequences for opening an closing the valve, and also have different levels of opening or closure, that is, the flow level can be controlled with the granularity given by the amount of reflective stripes in the encoder plate (23).

Time Based Water Dosage

The closure and opening of the vale has been explained using the CREDIT register and the time periods or windows as the control variables; however, the invention also be used as a time base dosage system for which the user of a water meter (1) can be omitted, that is, the invention can perform the control of volume and flow rate based on the real time clock (61) contained in the Microcontroller (59).

For the later operation, the application program compares the value stored in TIME_CURRENT against the values specified in registers that define a time window and that we will call HOUR_APERTURE and HOUR_CLOSURE. When the value stored in TIME_CURRENT and that is constantly updated by the real time clock (61) is greater or equal than the value stored in HOUR_CLOSURE, the program will execute a process to take the valve to a the position specified in the register LEVEL_CLOSURE where a minimum or zero flow rate is specified. The later condition will be maintained until the application program finds that the value in TIME_CURRENT is greater or equal than the value stored in HOUR_APERTURE. For this application if the value of HOUR_CLOSURE is equal to the value of HOUR_APERTURE, the program considers that this mode of operation is not enabled.

Use of Bi-Stable Valves

The description for the UDA(8) in conjunction with the UDG(7) resembles a servomechanism that allow the control of the flow rate since the valve can have several levels or aperture; the UDG (7) and the UDA(8) can be designed to operate in two states using valves or actuators that allow only two levels of flow rate, that is fully open or fully close. Such is the case of solenoid valves.

Auxiliary Output

The Control Unit (3) allows the interface to external control systems by means of connector (64) illustrated in FIG. 8. The voltage at signal C_AUX can be used to interconnect other devices each time the application program performs a manipulation over the UDA(8) by means of the UDG(7) when a flow rate or total closure is desired. The state of the signal C_AUX can be controlled configuring the register called ACTIVATE_AUXILIAR. The waveform to be generated at C_AUX can also be changed using the registers HIGH_AUXILIAR and LOW_AUXILIAR. When the value of register HIGH_AUXILIAR and LOW_AUXILIAR are equal to zero, the invention will not activate the auxiliary output C_AUX, and it will always be maintained in an idle state.

If the value stored in HIGH_AUXILIAR is zero and the value if LOW_AUXILIAR is different than zero, the application program will activate C_AUX placing a high or VCC value in the C_AUX signal when the value of ACTIVATE_AUXILIAR and the position of the valve are equal. When the later described condition is meet, the C_AUX signal will be activated by a time period given in HIGH_AUXILIAR, in a similar way as a "one shot" circuit. The activation time will be given by multiples of ⅒ of a second, given a maximum value of 25.5 seconds for the current implementation that uses an 8 bit register for ALTA_AUXILAR.

When the values stored in ALTA_AUXILAR and LOW_AUXILIAR are both different to zero, the electrical signal present in C_AUDX will take the form of a square wave with a frequency and duty cycle given by the values stored in HIGH_AUXILIAR, that give the amount of time in ⅒ of a second that the signal will remain in a high (VCC) state and the value stored in LOW_AUXILIAR will give the amount of time in ⅒ of a second that the signal will remain in a low or GND value. The frequency of the signal is then given by 10/(HIGH_AUXILIAR+LOW_AUXILIAR).

Given the low power requirements of the invention, the C_AUX signal could require further processing by the device or equipment that is going to be connected to it. Once the signal is processed, it can be employed to control other services like electricity using a special actuator for this purpose. Still another use or the auxiliary signal could be the notification to the user by means of visual or audible interfaces that the invention has reached a service cancellation or restriction state. The use of an auxiliary signal can be used by the water company in a variety of control schemes depending on their requirements and local regulations.

Low Energy Detection

The Control Unit (UDC)(3) can monitor of available energy in the Energy Unit BAT (5) by means of the Low Battery Detection and Protection Unit (UBB) (6). The circuit showed in FIG. 6 obtains a voltage from the Energy Unit (5) voltage present in signal S_VBAT (48) that is connected to signal VCC (41) using the reverse polarity protection Shottky diode (49). The operation voltage for this embodiment is 3 Volts so a 3.6V lithium battery with 2.1 Ampere-hours is used as the Energy Unit BAT (5).

For this implementation, the amount of energy stored in the Energy Unit BAT(5) is enough to support the operation of the system (including the Motor (18) actuation) for an average time of 6 years considering one open to close cycle per day. In case the energy stored in the battery BAT (5) runs out, it can also be replaced.

The Microcontroller (59) activates signal C_LOWB (51) placing a logic zero each time the application program decides to do so. The later action turn on the voltage detector (50) is a device that internally compares the voltage present at VCC(41) with an internal reference. If the level of the voltage present at VCC (4), the signal M_LOWB (52) will change its state indicating to the Control Unit (3) that the life of the Energy Unit (5) has reached its end. The detector (50) can be implemented for this embodiment using the MN-13811-G from Panasonic.

The actions taken when the Energy Unit (5) life has reached its end are dictated by the application program but the condition must be reflected in a register stored in non volatile memory (60) and that contains flags that indicate abnormal operation of the invention; like magnetic tampering detected by signal (4), the removal of the interconnection cable to the water meter (1) by means of signal (11), leakage detection or abnormal operation of the valve. The information contained in this register can be accessed using the Communication Unit (UCO)(4).

Reading and Configuration

Figure 7:
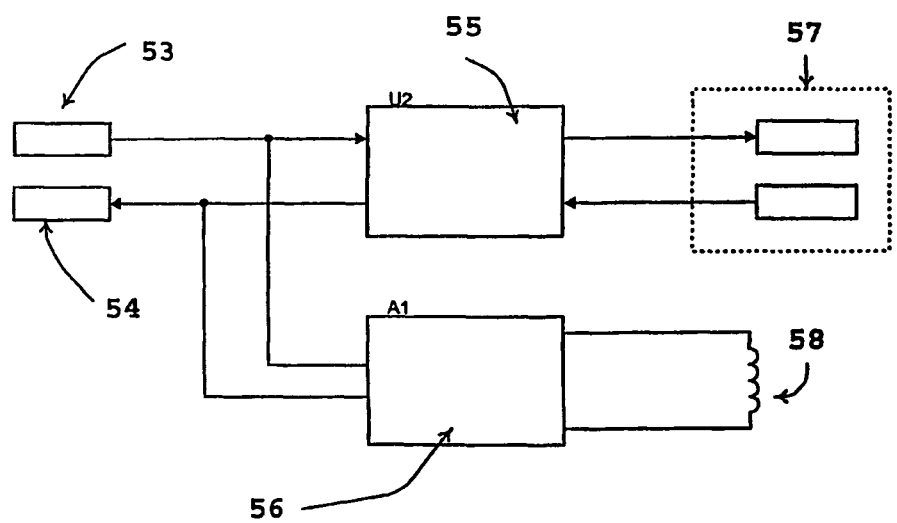
FIG. 7 refers to a simplified description of the Communication Unit (UCO).

The water company uses the Communication Unit (4) as the means to transfer information between the invention and a Computer. The information is transferred using a proprietary secure, standard or commercial communication protocol that can assure error detection, passwords and encryption of data as a protection against frauds. The communication is done using a serial communication port like RS-232C to connector (57) as shown in FIG. 7.

The communication signals in (57) are level shifted to make them compatible with the thee Control Unit (3) electrical requirements. The later function is performed by the converter (55) implemented in this embodiment by an integrated circuit like the DS275 from Dallas Semiconductors. The converter (55) uses the energy available at signals (57) to perform the level shifting; this way, the energy required to perform this action is supplied by the computer (63)

Additionally, the communication can also be established with out physical contact by means of a computer (63) equipped with an inductive transmitter-receiver. In such a case, the communication is performed by means of antenna (58) and the signals are adapted and conditioned by the inductive converter (56). The contact-less communication is performed modulating a high frequency signal by the data, the resultant signal couples to the antenna coil (58). For the present embodiment, inductive communication techniques like the ones used by Hexagram Inc or Fusion Meter LTD for this purpose. The contact less communication has as a primary advantage the lack of connectors required for the wired interface, increasing the robustness and tamper proof of the invention.

Another method of communication can be the transmission of signals using radio frequency signals. For these types of schemes, integrated radio modules can be used like the TR1000 from RF Monolithics Inc. that operated in the 900 Mhz with enough power level to have a communication distance in the order of the hundred of meters.

Still another method for communication can be the traditional telephone line using a modem for embedded application. For this case, the converter (55) could be replaced by a pair of integrated circuits like SI2400 and SI3015 from Silicon Laboratories Inc. These devices transform the logic levels present in signal C_TXD (33) in a audio signal that can be transmitted while simultaneously, the audio signals received are decoded and coupled to the signal M_RXD (54). In this type of implementation, the signals generated in (57) can be coupled directly to a telephone line allowing the invention to make and receive calls to transfer the information so the computer (63) can be installed in a remote location.

Regardless of the communication method employed, a change of state in signal M_RXD (54) is detected by the Microcontroller (54). If the Microcontroller (54) was in a sleep state, it will be awaken by the event and it will start to receive the information transmitted by the external device or computer (63).

The information transfer is controlled by an application protocol that verifies and validates the communication access; the later is required to avoid fraudulent communication attempts. Once a valid access is detected, the application program in the Computer (63) can access the memory of the Microcontroller (59) to write and read the memory content. The reading operation allows the Computer (63) to transfer the registers that contain information related to the volume consumed by the user. In this embodiment, a register that reflects the current value of the water meter (1) odometer, so using this method it is possible to eliminate human errors in the reading process. In a similar fashion, the water company can access information regarding the state of operation of the invention, this information can indicate back flow volumes, magnetic tampering attempts, removal of the sensor cable (17) connected to the water meter (1). The information stored in the non volatile memory (60) is converted to a serial format and outputted from the Microntroller (59) by means of signal C_TXD (53) to the interface connector (57), a telephone modem, or the antenna (58) for any kind of wireless communication method.

The invention also provides a method for reading electronically the information related to the invoicing of the water meter (1) using the available communication means. The invention also provides the means to control the water volume consumed by the user with the purpose of a programmed dosage as required by the water company.

The water company can configure or reprogram the operation of the invention changing the values of the registers contained in the non volatile memory (60). The new changed values will dictate the behavior of the application program executed by the Microcontroller (59); the parameters to change can be the allowed volume, allowed instant flow rate, time periods or windows or real time clock (61) updating to name a few.

Padlock Operation Mode

The water company can dosage the water supply in a discretional way, on site o remotely. By placing the valve in the desired position and it will remain in that state until another change of position is requested or until the automatic operation is re-established. To perform the Padlock Operation Mode, the water company will change the value of the PADLOCK register using UCO (4). A value different than zero in PADLOCK register maintains all operations except the valve actuation since it will remain in the position defined by the value stored in the register. To return to the automatic operation, the water company must change the again the register PADLOCK placing a value of zero in its content. The valve will then move to the position determined by the open and closure algorithm using the criteria and procedures already described for the automatic operation.

Prepay Operation Mode.

The invention can also be used as a prepay system, since a volume can be configured by the water company as the maximum allowed consumption to be employed not just only as a restriction or limitation method, but it can also be defined as a previously paid volume that must be configured by the water company using the communication means previously described.

In the same way the water company can interact with the invention by means of a computer (63) for reading and writing configuration information, it is possible that the user can be also supplied with a low cost computer to transfer the credit information as in an electronic purse and use the invention in a prepay and auto-read mode.

The user computer or microcomputer will have limited access to the configuration registers and it can also be used to obtain information regarding it consumption as to control the opening or closing of the valve (with limitations to avoid battery drainage) and if credit is available; that is, it will allow the user a way to avoid consumption discretionally.

The user computer can be a specially designed device with minimum capabilities, or a commercial hand held computer like a PDA can be used. If a PDA or similar device is used, the water company could supplied the application programs required for the user computer operation and also the physical means required the transfer of information using the Communication Utility (UCO) (4).

In the Prepay Operation Mode, the water company o the user will use the Communication Unit (UCO) (4) to transfer configuration information that will change the value in CREDIT register stored in the non volatile memory (60). The water company previously configure using the described means the registers CLOSURE, SCHEDULE(x), FACTOR_H(x), LEVEL_LOW_FLOW and LEVEL_CLOSURE to name some. The later registers can also be modified indirectly by the same user when the CREDIT register value is transferred. That is, the water company redefines the value of the registers and stored in to the user computer in conjunction with the purchase credit stored in register CREDIT_AUTHORIZED. The later capability allows the water company a way to maintain the control of the invention in an offline non-real time fashion allowing the adjustment of the operation parameters by the season, during emergency periods or to incentive or dissuade a particular user consumption.

For the prepay operation implementation, the value in PREPAY register is configured with a value different that zero and the value of the RECHARGE value is made zero in case that the water does not allows emergency water usage. When the valve is moved to the position dictated by the LOW_FLOW register, the invention will maintain the valve (28) at that level but it will continue to decrement the value stored in CREDIT. The flow rate reduction generated by the valve position at LOW_FLOW can be used as a warning advisory that the user must acquire more credit and it will remain in that state until the value stored in CLOSURE is reached and the valve is moved to the position dictated in register LEVEL_CLOSURE. When the time window or period expires, the register called CREDIT is updated using the relation CREDIT=CREDIT+RECHARGE as it was already described. A value of RECHARGE equal to zero will maintain the CREDIT value equal to zero and the service will not be reestablished. A value of RECHARGE different than zero and with in the LOW_FLOW value, will offer the user a credit in case of emergency using a cyclic scheme and using flow restriction that is updated when the time period or window expires. During the acquisition of volume from the water meter (1) under this mode, another register called VOLUME_EMERGENCY is updated.

When the user purchases new credit and transfers it using (63), the application program resident in the Microcontroller (59) will perform the following operations to update the registers: CREDIT=CREDIT+CREDIT_AUTHORIZED−VOLUME_EMERGENCY, and after CREDIT is updated, the register VOLUME_EMERGENCY is made equal to zero. Using the later scheme, the CREDIT value is updated and compensated if the cyclic emergency credit has been configured. Depending on the value of CREDIT register, the valve (28) will be manipulated or it will remain in the same state as previously described.

In the Prepay method, the user computer plays the role of the purchased credit carrier. Depending on the features of the computer, the user can purchase credit using sophisticated schemes like a telephone line using secure monetary transfer mechanisms under protocols like TCP/IP (Internet) or the user can also directly load the credit in the water company offices. Lower infrastructure methods for credit transfer to the user can also be used depending on the socio-economic level of the target market.

A method for credit transfer that has low infrastructure requirements can be the direct keying in the computer. Under this scheme, the user purchases the credit in the operator offices, a cash register in the convenience store or an ATM station to name some methods. After the commercial transaction is made, the user obtains a printed ticket or a verbal series of numbers that contain the CREDIT_AUTHORIZED coded and encrypted using the account number or meter number from the user as the encryption seed. To transfer the credit the user keys in the numbers in the computer that in turn stores the number in its memory. After that operation, the user transfer the credit to the invention by means of the Communication Unit (UCO)(4) using one of the methods previously discussed. The Microcontroller (59) decrypts the numbers and updates the register CREDIT_AUTHORIZED as some other parameters that the water company would want to change. For the encryption and decryption of the information there are a large amount of public domain algorithms focused to this types of applications like DES, Blowfihs, IDEA or RC4.

For water companies that have a greater capability for infrastructure investment, the user computer can be enabled with IC cards or magnetic strip cards that in turn can be disposable or rechargeable. The use of rechargeable cards is the best option since during the recharge of credit the water company can obtain information related to the consumption of the user transforming the credit transfer process in a bi-directional process as required by the "Self-reading mode" that will explained with more detail. For the discussed methods, the user computer is used as a physical bridge that allows to combine multiple technologies for credit transfer with out changing the UCO (4) in the invention, and this UCO(4) can be implemented using low cost components. Under this scheme, the cost of the devices required for the reading and writing of cards or credit carriers is moved to the terminal and not to the invention so its features will depend on the target market, normative issues and the current state of the art.

Valve Control Under Prepay Mode Operation

Is sometimes desired that a system under the prepay mode will offer the means to the water company to control the maximum allowed daily volume in each user. This can happen in places where water is a scarce resource or during extraordinary periods like draughts.

This volume control can be made when the application program executed by the Microcontroller (59) the values of registers VOLUME_C, LOW_FLOW_C and CLOSURE_C stored in (60) are configured in such a way that instigate the mode. The application program will move the valve to the positions LEVEL_LOW_FLOW and LEVEL_CLOSURE as previously describe. The position of the valve is modified to LEVEL_APERTURE when the time period or window expires if and only if the conditions established for the Prepay Operation Mode are meet.

Self-Reading Mode.

Under the self-reading scheme, the registers stored in the non volatile memory (60) can be read by the user himself. That is, the user takes the function of the reading employee and transfers the information to the commercial system of the water company. The information is retrieved from the user computer using a similar method of communication (wired or wireless) under the same principles as for the communication with the invention. Additional methods like IC or magnetic cards can also be used for this purpose. Also, depending on the capabilities of the user computer, it could be used as a reader for a group of devices.

Compliance with Encoder Registers

The explanation for the preferred embodiment of the invention was focused on the detection of pulses from a water meter (1) to determine the flow rate and volume. The UIM(2) can be modified to read information supplied by what is commonly known as encoder registers. The encoder registers translate by mechanical or optical means the value of each digit in the water meter (1) odometer to a binary code that can be directly read by the UDC (3). In such a case, the Microcontroller (59) can be awaken for its sleep state each time a change in a digit is detected or the application program executed by (59) can be modified to periodically read the encoded register emulating the actions generated when the signal M_FLUJO is activated in the pulse emitter water meters.

Compliance with Other Utility Services.

The logic for the supply control described in this document and the prepay implementation methods and the auto-reading can also be used in other fields like electricity and gas if they can be coupled with the proper sensing and control elements and also with the proper adaptation of the internal registers to operate in the proper units of measure and control.

For the sensing, there are commercial meters available that offer pulse outputs or encoded registers.

For electricity, integrated circuits like the AD7755 from Analog Devices can offer an economical solution to transform the voltage and electrical current in the user premises in pulses that represent the power and can be directly coupled to this invention if the commercial available meters would not provide directly this information. From the control point of view, the actuation can be performed using a total restriction of the service. In the case of gas, the Control and Feedback Unit (UDA) can be employed to control the flow of as with the pertinent modification to comply with security issues, or the actuator can be replaced by a bi-stable valve like the Pressure pulse de BLP Components L.T.D. For the case of electricity, the UDA (8) can be replaced by a magnetic contactor like the Power pulse from BLP Components L.T.D and that allows the service suspension and re-activation using a low energy signal to perform the manipulation.

The invention claimed is:

1. A mechanical and electronic water supply control assembly and system for automatically supplying water at a predetermined volume of water on a daily basis autonomously, supplying water at a predetermined flow rate at predetermined times and repeatedly until reprogramming and for monitoring water consumption during a predetermined time period, comprising:
    a water meter connected to a water outlet;
    a flow control valve connected to the water outlet;
    said system being enclosed in a sealed housing and said system having an interface unit connected to said water meter;
    a control unit connected to said water meter and flow control valve for controlling the flow rate of water through said water meter at predetermined times during a day;
    a gain unit and an actuation and retro-fitting unit connected to said control unit for actuating said control unit, said actuation and retro-fitting unit connected to said meter for actuating said flow control valve to supply the predetermined volume of water at a predetermined flow rate for a predetermined time period during a day on a daily basis;
    a communication unit connected to said control unit;
    a power unit for supplying electrical power to said assembly; and
    a protection and detection unit connected to said power unit to sense available power for said assembly and for preventing inversions of the polarity of said power unit;
    said sealed housing enclosing said system and protecting said system from environmental humidity, water and unauthorized intrusion, said assembly further comprising a computer receiving input signals from said communication unit.

2. The system of claim 1, wherein said control unit actuates said flow control valve to open and close said valve to deliver said predetermined volume of water for a predetermined period of time.

3. The system of claim 1, wherein said interface unit comprises a water flow detector, a water flow back detector, and an unauthorized intrusion detector, said interface meter being connected to said control unit by a wire and producing signals corresponding to water flow, water backflow, unauthorized intrusion and detection of a magnetic field, and filters to eliminate noise from said signals.

4. The system of claim 1, wherein said control unit comprises a micro-controller having a memory and a real time clock for maintaining a stable time base.

5. The system of claim 1, wherein said gain unit comprises a transistor, resistors and protection members for protecting said gain unit power surges, said profit unit producing and sending signals to said actuation and retro-fitting unit to actuate a motor in said actuation unit to actuate said flow control valve in said water meter.

6. The system of claim 2, wherein said control unit transmits a logic signal to said actuation unit, said actuation unit receiving and converting said logic signal to send electrical power to said flow control valve to adjust a water flow rate to a selected setting at predetermined times.

7. The system of claim 1, wherein said flow control valve is a spherical valve coupled to said actuation unit, said actuation unit including a motor connected to said valve for actuating said valve, and where said gain unit produces a signal to actuate said motor to adjust the flow control valve to a selected setting.

8. The system of claim 4, wherein said actuating unit includes an optical sensor to detect a position of said valve and sends a signal corresponding to said valve position to said control unit.

9. The system of claim 1, wherein said communication unit transmits a signal to an external device by wires through a converter or by a wireless channel through a converter.

10. The system of claim 1, wherein said protection and detection unit includes a diode and sends a voltage signal indicating an available voltage in said power unit to said control device, and where said protection and detection unit includes a voltage detector to produce low battery signal and to send said low battery signal to said control unit.

11. The system of claim 1, wherein said control unit actuates said valve to dispense a predetermined volume of water through said valve for a predetermined period of time, and where said control unit monitors water consumption at said water outlet and calculates a value corresponding to said predetermined period.

12. The system of claim 11, wherein said control unit calculates a cost of said volume of water flowing through said meter and calculates said predetermined volume based on said cost.

13. The system of claim 1, wherein said control unit calculates a cost of water consumed at predetermined times.

14. The system of claim 1, wherein said control unit is programmable by an electronic connection, physical connection or wireless connection to reprogram said control unit.

15. The system of claim 1, comprising means to limit access to said system to selected reading and program levels authorized by security keys.

16. The system of claim 1, wherein said system is installed outdoors.

17. The system of claim 1, wherein said control unit includes a microprocessor to selectively actuate said valve between an open and closed position, maintain said valve in a fixed position, continuously calculate a cost of consumed water, and determining a water supply end time.

18. The system of claim 1, further comprising a portable computer terminal connected to said control unit for transferring a status reading to a personal computer or network or by a network system.

19. The system of claim 15, wherein said control unit is readable and programmable by said computer terminal.

20. The system of claim 1, wherein the gain unit determines a prepaid credit value for water and adjusts the flow control valve according to a remaining credit value.

21. The assembly of claim 1, wherein said control unit actuates said flow control valve to supply a predetermined daily volume of water each day on a daily basis and closes said flow control valve when said predetermined daily volume is consumed.

22. A mechanical and electronic water supply assembly enclosed within a sealed housing for supplying water to a consumer, said assembly comprising:
   a water meter connected to a water supply for supplying water to the consumer and measuring the volume of water supplied to the consumer on a daily basis;
   a flow control valve connected to the water supply for controlling the flow rate of water to the consumer;
   an interface unit and control unit connected to said water meter and flow control valve for controlling the volume and flow rate of water to the consumer;
   a gain unit and an actuation and retrofitting unit connected to said water meter and flow control valve to control the supply of water to the consumer;
   a communication unit connected to the control unit; and
   a power unit for supplying power to said assembly and a protection and detection unit connected to the power unit to sense available power and prevent inversion of power;
   wherein said assembly supplies a predetermined allocated daily volume of water to the consumer on a daily basis, and wherein said control unit actuates said flow control valve to supply the water at a selected flow rate throughout the day based on the allocated daily volume of water; and
   wherein said control unit actuates said flow control valve to reduce the flow rate of the water when a selected portion of the daily allocated volume is supplied during a day and restores the flow rate on a subsequent day to supply the corresponding allocated daily volume of water.

23. The assembly of claim 22, wherein said control unit actuates said flow control valve to reduce the flow rate of the water at a first selected time during the day and to restore the flow rate at a second selected time during the day.

24. The assembly of claim 22, wherein said control unit actuates said flow control valve to close said flow control valve when said predetermined allocated daily volume is supplied, and thereafter open said flow control valve to reestablish a flow rate when a subsequent allocated daily volume is authorized.

25. A mechanical and electronic water supply assembly for supplying water, said assembly comprising:
   a water meter connected to a water supply for measuring a volume of water supplied to a consumer;
   a flow control valve connected to said water supply for controlling the flow rate of water from said water supply;
   an interface unit connected to said water meter;
   a control unit connected to said water meter and flow control valve for controlling the volume and flow rate of water to said consumer at predetermined times during a day; and
   a gain unit and an actuation and retrofitting unit connected to said water meter and flow control valve for actuating said flow control valve to supply water to the consumer at a predetermined volume for a day and supplying the water at a predetermined flow rate at predetermined times during the day in response to the predetermined volume.

* * * * *

UNITED STATES PATENT AND TRADEMARK OFFICE
CERTIFICATE OF CORRECTION

PATENT NO.       : 8,719,187 B2
APPLICATION NO.  : 10/472221
DATED            : May 6, 2014
INVENTOR(S)      : Fernando Milanes Garcia-Moreno It is certified that error appears in the above-identified patent and that said Letters Patent is hereby corrected as shown below:

On the title page, the title of the invention, item (54), and in the specification, column 1 should read:

ELECTRONIC AND MECHANICAL SYSTEM FOR AUTOMATED OR
DISCRETIONARY DOSAGE OF POTABLE WATER AT THE PARTICULAR INTAKE
LEVEL OF EACH USER

Signed and Sealed this
Twenty-seventh Day of October, 2015

Michelle K. Lee
*Director of the United States Patent and Trademark Office*